United States Patent [19]

Ikari

[11] 4,055,711

[45] Oct. 25, 1977

[54] LEAD-ACID STORAGE BATTERY

[75] Inventor: Shinichi Ikari, Kumagaya, Japan

[73] Assignee: Masao Kubota, Tokyo, Japan

[21] Appl. No.: 761,780

[22] Filed: Jan. 24, 1977

Related U.S. Application Data

[63] Continuation-in-part of Ser. No. 618,260, Sept. 30, 1975, abandoned.

[30] Foreign Application Priority Data

Oct. 3, 1974 Japan .................................. 49-113320

[51] Int. Cl.² ............................................ H01M 2/16
[52] U.S. Cl. .................................... 429/143; 429/146; 429/225; 429/234
[58] Field of Search ............................... 429/143–146, 429/225–228, 234, 247

[56] References Cited

U.S. PATENT DOCUMENTS

| | | | |
|---|---|---|---|
| 2,084,964 | 6/1937 | Smith | 429/247 X |
| 3,083,250 | 3/1963 | Geissbauer | 429/234 X |
| 3,247,023 | 4/1966 | Geissbauer | 429/234 X |
| 3,900,341 | 8/1975 | Shoichiro et al. | 429/143 X |

*Primary Examiner*—C. F. Lefevour
*Attorney, Agent, or Firm*—Woodling, Krost, Granger & Rust

[57] ABSTRACT

This invention generally relates to a lead-acid storage battery comprising positive plates having the characteristic of both paste type and clad type plates and pasted negative plates which are alternately arranged and separators each disposed between the adjacent positive and negative plates. The positive plates each comprise a grid or substrate having spaced longitudinal members of electrically conducting material and spaced latitudinal members formed integrally with the longitudinal members, the latitudinal members having the thickness smaller than that of the longitudinal members. The latitudinal members may be omitted if the substrate can be filled with active material without any latitudinal members. Each of the positive plates comprises pasted active material filled in the grid; and active material holder composed of porous insulating sheets mounted on active material.

7 Claims, 9 Drawing Figures

LEAD-ACID STORAGE BATTERY

This application is a continuation-in-part of my co-pending application, Ser. No. 618,260, filed Sept. 30, 1975 now abandoned.

BACKGROUND OF THE INVENTION

In general, a lead-acid storage battery can be broadly classified into a paste type one and a clad type one. The paste type lead-acid storage battery comprises pasted positive plates and pasted negative plates while the clad type lead-acid storage battery comprises positive plates having active material clad with successive integral tubes of porous insulating material and pasted negative plates. They are placed in a case so that they are alternately arranged, with an insulating separator provided between the adjacent positive and negative plates, and so that they are immersed in an electrolyte of dilute sulfuric acid. Generally, the paste type lead-acid storage battery is suitably used in the event that a good starting property is required while the charge and discharge are repeated at higher frequency, but it has the disadvantage of short life. On the other hand, the clad type lead-acid storage battery is suitably used in the event that the charge and discharge are repeated at lower frequency, but has the disadvantages that it has lower energy and output densities and that it cannot be adapted to mass production.

A lead-acid storage battery which is adapted to be used for an electric car requires improvement in the energy and output densities and its mass production, as well as its long life. There has been provided no lead-acid storage battery that can meet all the requirements.

SUMMARY OF THE INVENTION

Accordingly, it is a principal object of the present invention to provide a lead-acid storage battery adapted to have higher energy and output densities and its mass production as well as its longer life.

In accordance with one aspect of the present invention, there is provided a lead-acid storage battery comprising positive plates and pasted negative plates, which are alternately arranged so that one of said positive and negative plates is disposed between the other plates, each of said positive plates characterized by comprising a substrate having at least spaced longitudinal members of electrically conductive material; pasted active material filled in said substrate; and an active material holder composed of porous insulating sheets mounted on both sides of said active material so that they hold said active material.

In accordance with another aspect of the present invention, there is provided a lead-acid storage battery comprising positive plates and pasted negative plates, which are alternately arranged so that one of said positive and negative plates is disposed between the other plates, each of said positive plates characterized by comprising a grid substrate having spaced longitudinal members of electrically conductive material and spaced latitudinal members provided integrally with said longitudinal members, said latitudinal members having the thickness smaller than that of said longitudinal members; pasted active material filled in said grid substrate; and an active material holder composed of porous insulating sheets mounted on both sides of said active material so that they hold said active material.

In accordance with another aspect of the present invention, there is provided a lead-acid storage battery comprising positive plates and pasted negative plates, which are alternately arranged so that one of said positive and negative plates is disposed between the other plates, each of said positive plates characterized by comprising a grid substrate having spaced longitudinal members of electrically conductive material and spaced latitudinal members formed integrally with said longitudinal members, with the ratio of the thickness $h_{30}$ of said latitudinal members to the thickness $h_{28}$ of said longitudinal members ($h_{30}/h_{28}$) being equal to or less than 0.8; pasted active material filled in said grid substrate; and an active material holder composed of porous insulating sheets mounted on both sides of said active material and having longitudinal ribs or partitions positioned between said longitudinal members and penetrated into said active material so that it is divided into active material portions surrounded and held by said porous insulating sheets together with said longitudinal ribs.

In accordance with another aspect of the present invention, there is provided a lead-acid storage battery comprising positive plates and pasted negative plates, which are alternately arranged so that one of said positive and negative plates is disposed between the other plates, each of said positive plates characterized by comprising a substrate having at least spaced longitudinal members of electrically conductive material, pasted active material filled in said grid substrate; and an active material holder composed of porous insulating sheets mounted on both sides of said active material and having longitudinal ribs or partitions positioned between said longitudinal members and penetrated into said active material with the edges of said opposing ribs abutted with each other, so that said active material is divided into active material portions surrounded and held by said porous insulating sheets together with said longitudinal ribs.

In accordance with another aspect of the present invention, there is provided a lead-acid storage battery comprising positive plates and pasted negative plates, which are alternately arranged so that one of said positive and negative plates is disposed between the other plates, each of said positive plates characterized by comprising a substrate having spaced longitudinal main members of electrically conductive material, spaced longitudinal auxiliary members or partitions of insulation positioned between the adjacent ones of said longitudinal main members, and spaced latitudinal members formed integrally with said main and auxiliary members, with the ratio of the thickness $h_{30}$ of said latitudinal members and the thickness $h_{28}$ of said longitudinal main members ($h_{30}/h_{28}$) being equal to or less than 0.8; pasted active material filled in said substrate; and an active material holder composed of porous insulating sheets mounted on both sides of said active material and bonded to said longitudinal auxiliary members at the edges thereof.

BRIEF DESCRIPTION OF THE DRAWINGS

The above and other objects and features of the present invention will be apparent from the description of the preferred embodiments taken with reference to the accompanying drawings in which.

DETAILED DESCRIPTION OF PREFERRED EMBODIMENTS

Figure 1:
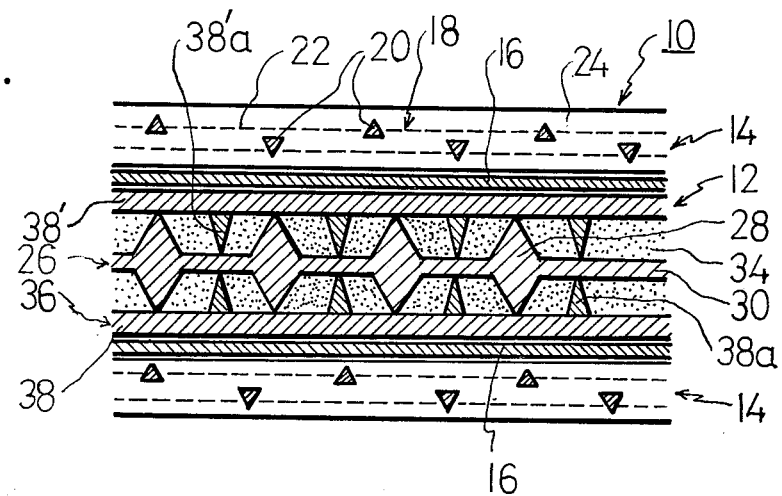
FIG. 1 is an enlarged horizontal sectional view of a portion of a plate arrangement of a lead-acid storage battery of the present invention.

FIG. 1 shows to a large scale a portion of a cell of a lead-acid storage battery 10 of the present invention. The battery may comprise a number of cells constructed according to the present invention and housed in a common battery case (not shown). Each of the cells comprises positive plates 12, only one of which is shown in FIG. 1 and negative plates 14, two of which are shown in FIG. 1, the positive and negative plates 12 and 14 being alternately arranged, as shown in FIG. 1. Insulating separators 16, which may each comprise a porous insulation such as a glass mat or the like, are disposed between the adjacent positive and negative plates so that the plates are insulated from each other.

Each of the negative plates 14 comprises a pasted one which includes a grid or substrate 18 of electrically conductive material such as lead alloy having a number of spaced longitudinal members 20, and a number of latitudinal members 22 traversing across the longitudinal members 20 and formed integrally therewith; and pasted active material 24 such as sponge lead paste filled in the grid or substrate 18.

Figure 2:
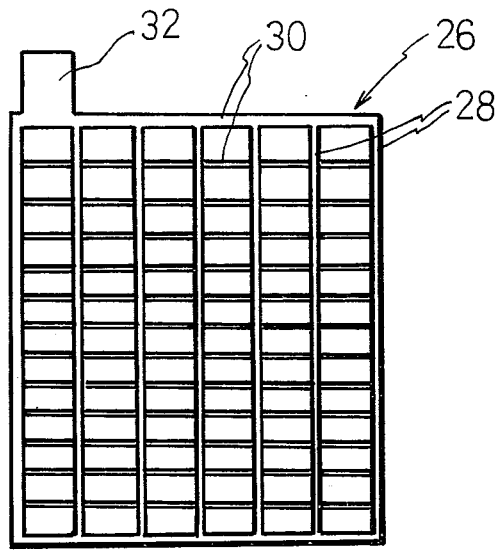
FIG. 2 is a front view of a grid-like substrate of a positive plate used in the plate arrangement of FIG. 1.
Figure 3:
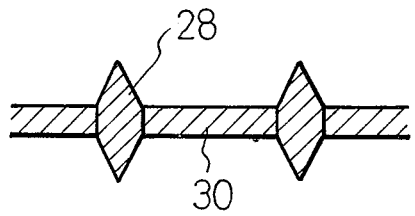
FIG. 3 is an enlarged horizontal sectional view of a portion of the substrate of FIG. 2.

Each of the positive plates 12 comprises a grid or substrate 26 having a number of spaced longitudinal members 28 of electrically conductive material such as lead alloy and spaced latitudinal members 30 of lead alloy, the longitudinal and latitudinal members 28 and 30 being formed integrally with each other (see FIG. 2). In the illustrated embodiment, the latitudinal members 30 may be composed of lead alloy, but they may be alternatively composed of insulation such as synthetic resin. An ear 32 is provided on the top of the substrate 26 to serve as a collector. Pasted active material 34 of lead peroxide is filled in the substrate 26. Thus, it will be understood that the positive plates are in the form of a kind of pasted plate and, therefore they are adapted to have high energy output densities and can be mass-produced.

Figure 4:
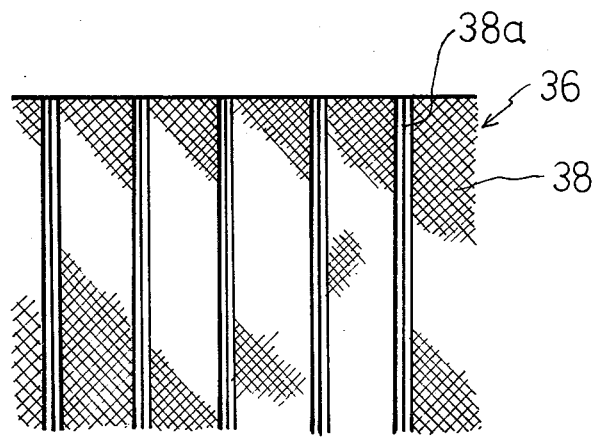
FIG. 4 is a front view of a portion of an active material holder used in the plate arrangement of FIG. 1.
Figure 5:
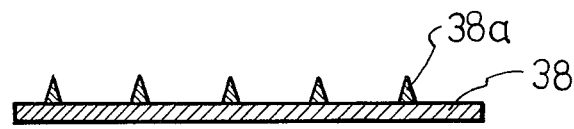
FIG. 5 is a horizontal sectional view of the active material holder of FIG. 4.
Figure 7:
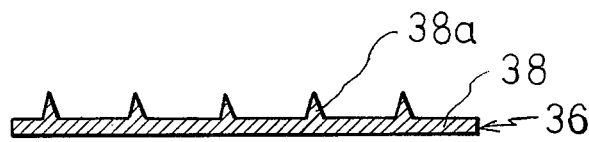
FIG. 7 is substantially similar to FIG. 5, but showing a modified active material holder.
Figure 8:
FIG. 8 is substantially similar to FIGS. 5 and 7, but showing a further modification of an active material holder.

There is provided an active material holder 36 which comprises two porous insulating sheets 38 and 38' in the form of woven or unwoven fabric composed of inorganic material such as glass, organic material such as polypropylene, polyethylene, polyester or the like, or compound of inorganic and organic materials. The porous insulating sheets 38 and 38' may be mounted on both sides of the active material 34 on the grid-like substrate 26 as described later so that they are attached to the active material. The porous sheets 38 and 38' may have the thickness ranging from 0.3 mm to 0.1 mm and the porosity of more than 150 meshes. If the porosity of the porous sheets 38 and 38' is less than 150 meshes, then the active material 34 unpreferably leaks through the meshes of the sheets. The physical factors such as materials and thickness of the porous sheets 38 and 38' may be optionally selected according to the application of the battery. As shown in FIGS. 4 and 5, the active material holder may be provided with longitudinal ribs or partitions 38a and 38'a of acid and oxidation resisting material such as polyethylene, polystyrene or the like, which may be bonded to the inner surfaces of the porous sheets 38 and 38' in a spaced relation to each other. Thus it will be understood that the facing longitudinal ribs constitute respective partitions. As shown in FIG. 1, the longitudinal ribs 38a and 38'a may be positioned between the longitudinal members 28 of the substrate 26 across the active material 34 with the ends of the ribs engaged against the latitudinal members 30 so as to divide the active material into active material portions and to surround them as if they are clad with insulating porous tubes as in the clad type plate. Thus, it will be understood that the positive plates are also in the form of a kind of clad plate and they can therefore have a longer life because the holder effectively holds the active material 34 on the grid-like substrate 26 so that it is not removed out of the substrate while it is expanded and contracted during operation of the battery. The longitudinal ribs 38a and 38'a may be alternatively formed integrally with the porous sheets 38 and 38', as shown in FIG. 7. Otherwise, as shown in FIG. 8, they may comprise convex portions of the corrugated porous sheets 38 and 38'. It will be noted that such ribs 38a and 38'a can serve to hold the active material 34.

It should be noted that the latitudinal members 30 have the thickness $h_{30}$ smaller than that $h_{28}$ of the longitudinal members 28 so that the ribs 38a and 38'a can be penetrated into the active material 34. It will be understood that the difference between the thicknesses of the longitudinal and latitudinal members 28 and 30 substantially corresponds to the thickness or protruding length of the ribs 38a and 38'a. It should be noted that the ratio of the thicknesses $h_{30}$ and $h_{28}$ ($h_{30}/h_{28}$) may be preferably equal to or less than 0.8. If it is greater than 0.8, then the thickness of the ribs 38a and 38'a must be correspondingly smaller so that the holder cannot effectively hold the active material 34. In the event that the ratio of the thicknesses $h_{30}$ and $h_{28}$ is within the above range, the active material 34 can be substantially surrounded and effectively held by the holder 36 so that the battery can be used for a longer period.

Figure 6:
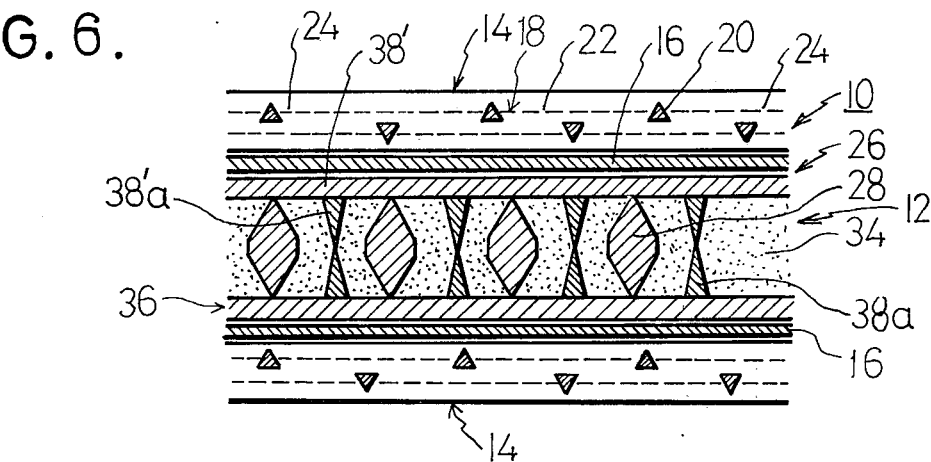
FIG. 6 is substantially similar to FIG. 1, but showing a modification of the present invention.

FIG. 6 shows the positive plate 12 which comprises the substrate 26 having no latitudinal members 30, which means that the thickness $h_{30}$ of the latitudinal members 30 and, therefore the ratio of $h_{30}$ and $h_{28}$ is zero. Such a positive plate has the active material portions completely surrounded and held by the ribbed holder 36 because the opposing longitudinal ribs 38a and 38'a are butted against each other to constitute the partitions. Therefore, the life of the battery becomes longer. It should be noted that the space between the adjacent longitudinal members 28 should be determined so that the pasted active material 34 can be effectively filled in the substrate 26.

There are two methods to mount the active material holder 36 on the active material 34. One method is to mount the porous sheets 38 and 38' on the active material 34 so that the longitudinal ribs 38a and 38'a are forced into the active material 34, after the pasted active material 34 is filled in the grid-like substrate 26 and before it is solidified. Thereafter, the positive plates are dried and electrolytically formed. Another method is to mount the porous sheets 38 and 38' on the active material so that the longitudinal ribs 38a and 38'a are inserted into the longitudinal grooves in the active material 34, after the positive plate is dried and electrolytically formed. The grooves in the active material 34 may be preferably formed after filling the pasted active material 34 and before drying it. The thus completed positive plates 12 are placed in the case together with the negative plates 14 and the insulating separators 16 in such an arrangement as shown in FIG. 1, and thereafter an electrolyte of dilute sulfuric acid is poured into the case.

Figure 9:
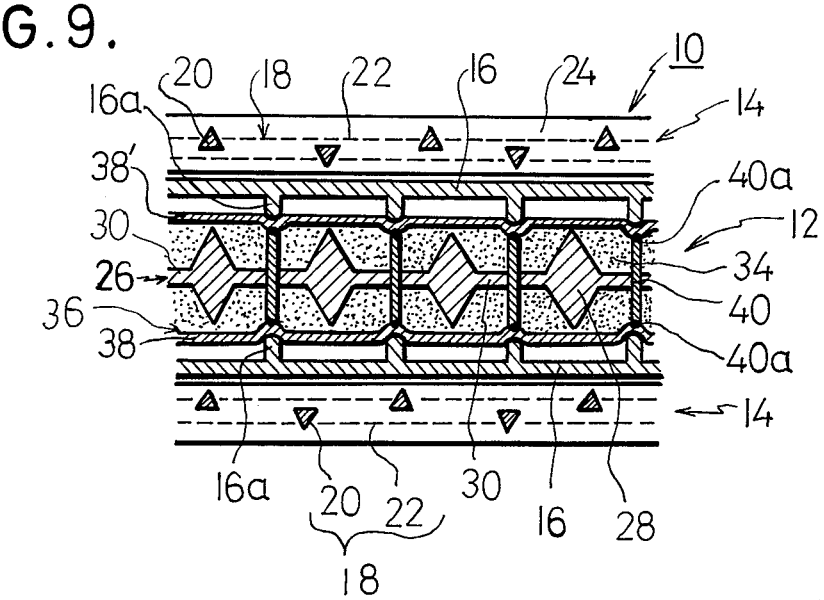
FIG. 9 is substantially similar to FIGS. 1 and 6, but showing a further modification of the present invention.

FIG. 9 shows another modification of the lead-acid storage battery 10 of the present invention. The same numerals designate the same components. In this modification, the grid or substrate 26 further comprises a number of spaced longitudinal auxiliary members 40 of insulation such as synthetic resin, positioned between the adjacent ones of the longitudinal main members 28 and formed integrally with the longitudinal and latitudinal members 28 and 30. In this modification, the auxiliary members constitute the partitions in the same manner as the longitudinal ribs 38a and 38'a in the aforementioned embodiments as shown in FIGS. 1 and 6. The auxiliary members 40 are shown to have preferably the thickness substatially equal to that of the main members 28. In addition, the porous sheets 38 and 38' of the active material holder 36 are flatly formed and they are attached to the sides of the active material 34 and bonded to the longitudinal auxiliary members 40 and at the edges thereof by heating and melting them. In FIG. 9, numerals 40a designate the points at which the longitudinal auxiliary members 40 are fusion-bonded to the porous sheets 38 and 38' of the active material holder. The insulating separators 16 disposed on both sides of the positive plate 12 may be provided with longitudinal ribs 16a which serve to force the porous sheets 38 and 38' of the holder against the active material 34. With the modified positive plate, the active material 34 is held between the porous sheets 38 and 38' of the active material holder 36 pressed against the active material by the ribs 16a of the separators 16. It should be noted that the ribs 16a may be omitted if desired.

The following Table I shows the results of the comparison wherein the battery of the present invention was compared with the prior paste type and clad type batteries. The batteries used were of 6V and 200 AH. The battery of the present invention was constructed as shown in FIG. 1 and the ratio of $h_{30}$ and $h_{28}$ was 0.4. The life test was made in the manner in which the batteries were discharged for 2 hours and then charged for 6 hours. The batteries used in this test had the elements of weight substantially identical to each other, respectively, except for the active material holder 36 of the battery of the present invention.

Table I

| | Energy density w/Kg (per 5 hours) | Output density w/Kg (discharge at 400A) | Life cycle (complete charge and discharge) |
|---|---|---|---|
| Battery of the invention | 43 | 86 | 630 |
| Prior paste type battery | 45 | 88 | 310 |
| Prior clad type battery | 35 | 64 | 950 |

As apparent from Table I, the battery of the present invention has the substantially same energy and output densities as the prior paste type battery while the life cycle of the former is greater as twice as that of the latter.

The following Table II shows the results of another test in which the ratio of $h_{30}$ and $h_{28}$ in the positive plates of the battery of the present invention was changed to various values. In this test, the battery used was similar to that of the aforementioned test, except for the ratio of $h_{30}$ and $h_{28}$.

Table II

| $h_{30}h_{28}$ | 0.8 | 0.6 | 0.4 | 0.2 | 0* |
|---|---|---|---|---|---|
| Life cycle (complete charge and discharge) | 320 | 580 | 630 | 800 | 900 |

*The battery was as shown in FIG. 6.

As apparent from the Table II, as the ratio of $h_{30}$ and $h_{28}$ decreases, the life cycle of the battery increases.

While some preferred embodiments of the present invention have been described and illustrated with reference to the accompanying drawings, it should be noted that they are by way of examples and that the present invention is not intended to be defined thereby. It will be apparent to those skilled in the art that various changes and modifications may be made without departing from the spirit and scope of the present invention, which is intended to be defined by the appended claims.

What is claimed is:

1. A lead-acid storage battery comprising positive plates and pasted negative plates, which are alternately arranged so that one of said positive and negative plates is disposed between the other of said plates, and insulating separators each being disposed between the adjacent positive and negative plates, characterized by that each of said positive plates comprises a substrate having at least spaced longitudinal members of electrically conductive material with first and second outer surfaces of said spaced longitudinal members being substantially in first and second planes; pasted active material filled in said substrate substantially to the level of said first and second plane, respectively; and an active material holder including porous insulating sheets mounted on both sides of said active material, said insulating sheets each having an inner surface lying substantially in said first and second planes, respectively, and substantially engaging said outer surfaces of said spaced longitudinal members, a plurality of longitudinal partitions of insulating material secured to said inner surfaces of said porous insulating sheets and interleaved with said longitudinal members, said plurality of longitudinal partitions extending inwardly from said inner surfaces and being embedded in said active material so as to effectively subdivide the active material into smaller active material portions, and whereby the said partitions and porous insulating sheets are effective in holding more securely the active material on the substrate during charge and discharge of the battery.

2. A lead-acid storage battery as set forth in claim 1, wherein said substrate further comprises spaced latitudinal members integrally with said longitudinal members and having a thickness less than that of said longitudinal members, and wherein said partitions have the inner edges thereof engaged against said latitudinal members.

3. A lead-acid storage battery as set forth in claim 2, wherein the ratio of the thickness $h_{30}$ of said latitudinal members to the thickness $h_{28}$ of said longitudinal members ($h_{30}/h_{28}$) is equal to or less than 0.8.

4. A lead-acid storage battery as set forth in claim 1, wherein said inner edges of the partitions on one sheet are butted against the inner edges of the partitions on the other sheet of the respective positive plate.

5. A lead-acid storage battery as set forth in claim 1, wherein said substrate further comprises spaced latitudinal members integrally formed with said longitudinal members, and wherein said partitions comprise auxiliary longitudinal members of insulation integrally formed with said substrate.

6. A lead-acid storage battery as set forth in claim 5, wherein the ratio of the thickness $h_{30}$ of said latitudinal members to the thickness of said longitudinal members ($h_{30}/h_{28}$) is equal to or less than 0.8.

7. A lead-acid storage battery as set forth in claim 5, wherein said insulating separators have longitudinal ribs which are provided to force said porous insulating sheets against said active material.

* * * * *